(12) United States Patent
Laaksonen

(10) Patent No.: US 12,054,376 B2
(45) Date of Patent: Aug. 6, 2024

(54) CONTROL OF DRIVE OF A LIFT TRUCK

(71) Applicant: Mitsubishi Logisnext Europe Oy, Järvenpää (FI)

(72) Inventor: Janne Laaksonen, Riihimäki (FI)

(73) Assignee: Mitsubishi Logisnext Europe Oy, Järvenpää (FI)

( * ) Notice: Subject to any disclaimer, the term of this patent is extended or adjusted under 35 U.S.C. 154(b) by 53 days.

(21) Appl. No.: 17/767,670

(22) PCT Filed: Oct. 7, 2020

(86) PCT No.: PCT/FI2020/050660
§ 371 (c)(1),
(2) Date: Apr. 8, 2022

(87) PCT Pub. No.: WO2021/069797
PCT Pub. Date: Apr. 15, 2021

(65) Prior Publication Data
US 2024/0025715 A1    Jan. 25, 2024

(30) Foreign Application Priority Data

Oct. 10, 2019  (FI) ..................................... 20195867

(51) Int. Cl.
*B66F 9/075*  (2006.01)
*B60L 15/20*  (2006.01)
(Continued)

(52) U.S. Cl.
CPC .......... *B66F 9/07572* (2013.01); *B60L 15/20* (2013.01); *B60T 8/3255* (2013.01);
(Continued)

(58) Field of Classification Search
CPC ........ B66F 9/07572; B66F 9/24; B60L 15/20; B60L 2200/42; B60L 2240/12;
(Continued)

(56) References Cited

U.S. PATENT DOCUMENTS 5,343,971 A    9/1994  Heidelberg et al.
6,089,341 A *  7/2000  Gingerich .............. B60L 50/52
                                                    180/2.2

(Continued)

FOREIGN PATENT DOCUMENTS

CN    101380908 A    3/2009
EP       794104 A2 *  9/1997  .......... B60L 15/2036
(Continued)

OTHER PUBLICATIONS

Finnish Patent and Registration Office Search Report, Application No. 20195867, dated May 26, 2020.
(Continued)

*Primary Examiner* — Donald J Wallace
(74) *Attorney, Agent, or Firm* — MacMillan, Sobanski & Todd, LLC

(57) ABSTRACT

Method for controlling of at least two electric motors (230A, 230B) of an electric lift truck (200), each of the at least two electric motors (230A, 230B) controlled with a respective electrical drive (244A, 244B) and arranged to generate a torque to a respective drive wheel (210), the method comprising: generating a respective control signal to each of the respective electrical drive (244A, 244B) in response to a detection that a speed of the lift truck (200) is below a reference value and that a steering angle is within a reference range, the respective control signal carrying an speed orders (01, 02) for the each respective electrical drive (244A, 244B) for generating torques to the drive wheels (210). Aspects relating to a method, a control unit a computer program product and a lift truck are provided.

18 Claims, 3 Drawing Sheets

(51) Int. Cl.
*B60T 8/32* (2006.01)
*B60T 7/04* (2006.01)

(52) U.S. Cl.
CPC ....... *B60L 2200/42* (2013.01); *B60L 2240/12* (2013.01); *B60L 2240/24* (2013.01); *B60T 7/042* (2013.01)

(58) Field of Classification Search
CPC .... B60L 2240/24; B60T 8/3255; B60T 7/042; Y02T 10/72
See application file for complete search history.

(56) References Cited

U.S. PATENT DOCUMENTS

| | | | |
|---|---|---|---|
| 2014/0231160 A1 | 8/2014 | Makino et al. | |
| 2015/0012158 A1* | 1/2015 | Makino | B60W 10/08 701/22 |
| 2015/0090507 A1 | 4/2015 | Okada et al. | |
| 2016/0029555 A1* | 2/2016 | Ishii | B60L 15/2009 701/22 |
| 2016/0368496 A1* | 12/2016 | Honda | B60K 23/0808 |
| 2022/0340017 A1* | 10/2022 | Laaksonen | B60L 50/60 |

FOREIGN PATENT DOCUMENTS

| | | | | |
|---|---|---|---|---|
| EP | 2905165 A1 | 8/2015 | | |
| JP | H05162995 A | 6/1993 | | |
| JP | 2001334953 A | 12/2001 | | |
| JP | 2009078812 A | 4/2009 | | |
| JP | 2009143355 A | 7/2009 | | |
| JP | 2013251973 A | 12/2013 | | |
| JP | 2014113013 A | 6/2014 | | |
| JP | 2014128117 A | 7/2014 | | |
| JP | 2017105634 A | 6/2017 | | |
| JP | 2018044580 A | 3/2018 | | |
| WO | 9426551 A2 | 11/1994 | | |
| WO | WO-2023232732 A1 * | 12/2023 | ............ | B62D 11/04 |

OTHER PUBLICATIONS

PCT International Search Report and Written Opinion, Application No. PCT/FI2020/050660, dated Mar. 9, 2021.

Japanese Office Action, Application No. 2022520946, dated May 14, 2024.

* cited by examiner

CONTROL OF DRIVE OF A LIFT TRUCK

TECHNICAL FIELD

The invention concerns in general the technical field of lift trucks. More particularly, the invention concerns controlling of drive of the lift trucks.

BACKGROUND

As is well-known lift trucks are designed to carry heavy weights in the forks, or in any similar tool. The lift trucks also operate in a wide range of environments having e.g. flat areas but also slanted areas, such as ramps. Additionally, the environment may have a slippery surface which causes challenges to the lift trucks due to decreased friction.

In order to tackle the above described challenges so-called differential lock, aka. locking differential, may be applied to. The differential lock is a mechanism by means of which it is possible to bind both sides of a driven axle together. In the context of lift trucks the application of the differential lock the drive wheel residing on a surface being more slippery may start spinning, but the lift truck remains still due to the differential lock applied to both of the drive wheels.

A more sophisticated solution for addressing the same challenge is so-called dual drive solution, which is described by referring to FIG. 1. FIG. 1 illustrates a prior art solution of the dual drive implementation applied to a lift truck 100. The lift truck 100 may comprise a plurality of drive wheels 110 and one or more steered wheels 120. A torque to the drive wheels 110 may be generated with electric motors 130. Each drive wheel 110 may have a dedicated electric motor 130 and each electric motor 130 may be controlled with a respective controller 140. The controller 140 may refer to an entity comprising a control unit and an electrical drive, which is arranged to generate a current to the respective electrical motor 130 in accordance with a speed order given by the control unit to the electrical drive. In the dual drive solutions applied to the lift trucks 100 the speed orders, e.g. referred with O1 and O2, and especially their difference may be controlled in accordance with a steering angle α. For example, in the situation as depicted in FIG. 1 the mutual amount of the speed orders may e.g. be O1<O2 causing the actual speeds of the drive wheels to be V1<V2, respectively. As a result the lift truck 100 turns to the desired direction defined by the steering angle α. Correspondingly, if the steering angle α is zero, or within a predefined range close to zero, the steering orders may be equal i.e. O1=O2.

However, the drawback also with the dual drives is that drive wheels may lost a grip especially in situations in which the surface is slippery due to individual wheel control.

Hence, there is need to develop further solutions in order to mitigate, at least in part, the drawbacks in the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a control unit, a computer program product and a lift truck for controlling of electric motors of a lift truck through controlling of electrical drives.

The objects of the invention are reached by a method, a control unit, a computer program product and a lift truck as defined by the respective independent claims.

According to a first aspect, a method for controlling of at least two electric motors of an electric lift truck is provided, wherein each of the at least two electric motors are controllable with a respective electrical drive and arranged to generate a torque to a respective drive wheel, the method comprising: generating a respective control signal to each of the electrical drives of the at least two electric motors in response to a detection that a speed of the electric lift truck is below a reference value and that a steering angle of the electric lift truck is within a reference steering angle range, the respective control signal carrying a respective speed order to each of the electrical drives, wherein the respective speed orders for the electrical drives are defined to be within a predefined speed order range from each other, for generating torques to the drive wheels by each of the at least two electric motors.

For example, the speed of the electric truck may be determined by obtaining at least one measurement value from a sensor measuring at least one of the following: rotational speed of the at least one electric motor; rotational speed of at least one wheel of the electric lift truck.

Moreover, the steering angle of the electric truck may be determined by obtaining data by one of: a redundant angular Hall sensor positioned to a rear axle wheel turning axle; a redundant incremental Hall sensor positioned at a steering motor axle; a redundant absolute angle sensor positioned to a wheel turning axle; a single channel absolute angle sensor and a reference sensor positioned to a wheel turning axle; a linear distance sensor installed to wheel turning cylinders.

The method may further comprise: monitoring if a generation of the respective control signals carrying the respective speed orders is to be cancelled by defining a plurality of criteria for cancelling. For example, the criteria may comprise a criterion related to the speed of the lift truck and a criterion related to the steering angle of the lift truck. Further, the criteria may comprise at least one criterion related to a user action through a user interface of the lift truck. The user action may e.g. be one of the following: disabling a capability to generate the respective speed orders with the user interface; activating a brake function of the lift truck.

Still further, the predefined speed order range may be defined as one of the following: a single value defining the respective speed orders to be equal; a difference between the respective speed orders is at maximum such that a difference between drive wheel tread peripheral speeds is less than 0.5 (zero point five) meter per second (m/s).

According to a second aspect, a control unit for controlling of at least two electric motors of an electric lift truck is provided, wherein each of the at least two electric motors are controllable with a respective electrical drive and arranged to generate a torque to a respective drive wheel, the control unit comprising: at least one processor; and at least one memory including computer program code; the at least one memory and the computer program code configured to, with the at least one processor, cause the control unit to: generate a respective control signal to each of the electrical drives of the at least two electric motors in response to a detection that a speed of the electric lift truck is below a reference value and that a steering angle of the electric lift truck is within a reference steering angle range, the respective control signal carrying a respective speed order to each of the electrical drives, wherein the respective speed orders for the electrical drives are defined to be within a predefined speed order range from each other, for generating torques to the drive wheels by each of the at least two electric motors.

For example, the control unit may be arranged to determine the speed of the electric truck by obtaining at least one measurement value from a sensor measuring at least one of the following: rotational speed of the at least one electric motor; rotational speed of at least one wheel of the electric lift truck.

Moreover, the control unit may be arranged to determine the steering angle of the electric truck by obtaining data by one of: a redundant angular Hall sensor positioned to a rear axle wheel turning axle; a redundant incremental Hall sensor positioned at a steering motor axle; a redundant absolute angle sensor positioned to a wheel turning axle; a single channel absolute angle sensor and a reference sensor positioned to a wheel turning axle; a linear distance sensor installed to wheel turning cylinders.

The control unit may further be arranged to: monitor if a generation of the respective control signals carrying the respective speed orders is to be cancelled by defining a plurality of criteria for cancelling. For example, the control unit may be arranged to apply criteria comprising a criterion related to the speed of the lift truck and a criterion related to the steering angle of the lift truck. Further, the control unit may be arranged to apply criteria comprising at least one criterion related to a user action through a user interface of the lift truck. For example, the control unit may be arranged to apply as the user action one of the following: disabling a capability to generate the respective speed orders with the user interface; activating a brake function of the lift truck.

Still further, the control unit may be arranged to apply as the predefined speed order range one of the following: a single value defining the respective speed orders to be equal; a difference between the respective speed orders is at maximum such that a difference between drive wheel tread peripheral speeds is less than 0.5 (zero point five) meter per second (m/s).

According to a third aspect, a computer program product for controlling of at least two electric motors of an electric lift truck is provided, wherein each of the at least two electric motors are controllable with a respective electrical drive and arranged to generate a torque to a respective drive wheel, which computer program product, when executed by at least one processor, cause a control unit of the electric lift truck to perform the method according to the first aspect as defined above.

According to a fourth aspect, an electric lift truck is provided, the electric lift truck comprising: at least two electrical drives; at least two electric motors controllable with a respective electrical drive; and at least one control unit according to the second aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
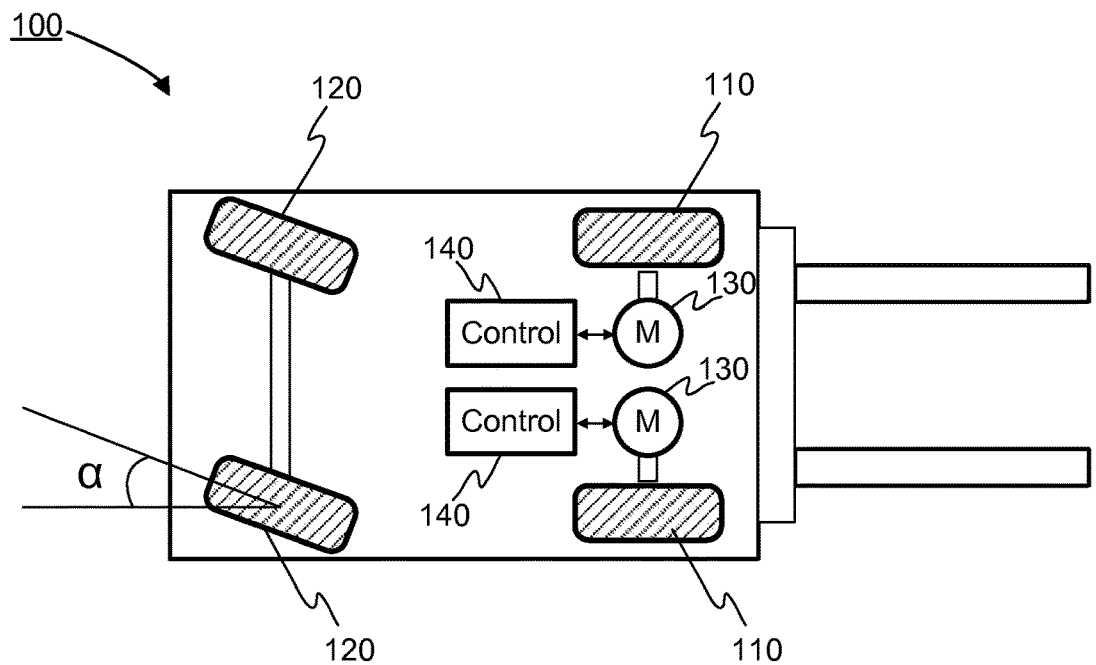
FIG. 1 illustrates schematically illustrates a prior art solution of the dual drive implementation applied to a lift truck.
Figure 2:
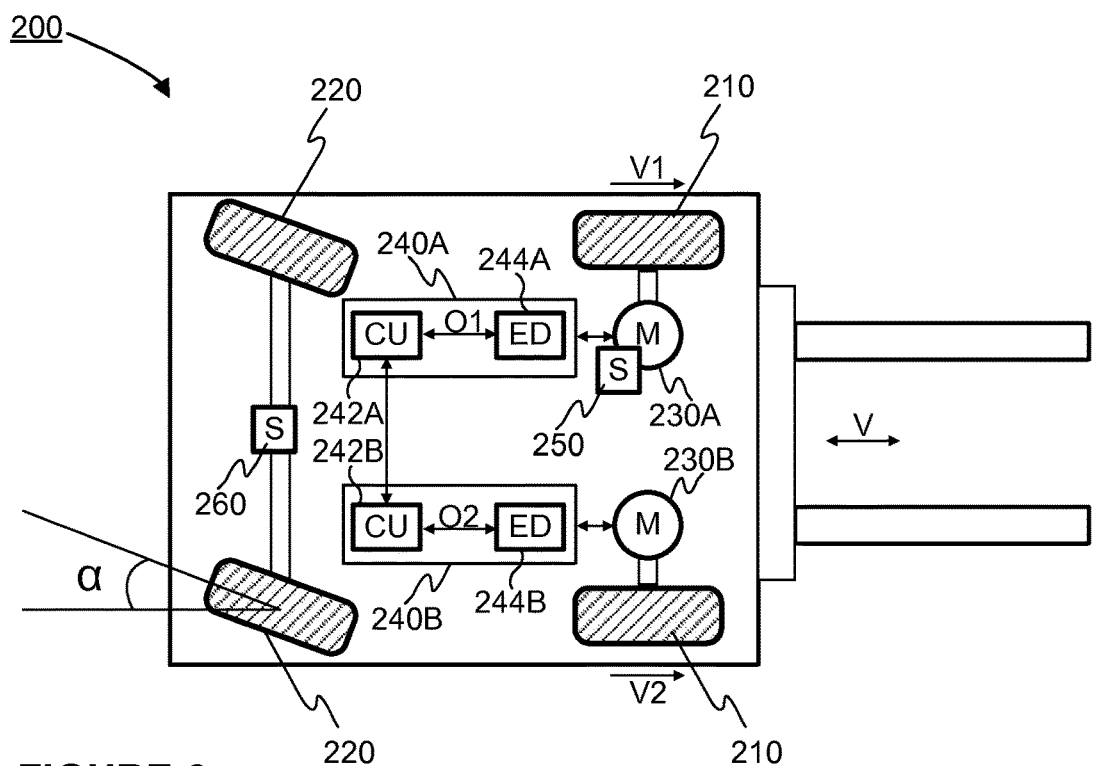
FIG. 2 illustrates schematically a lift truck according to an example embodiment.

The present invention may be applied in a lift truck as schematically illustrated in FIG. 2. FIG. 2 illustrates a lift truck 200 according to an example embodiment wherein a dual drive is implemented to. The lift truck 200 may comprise a plurality of drive wheels 210 and one or more steered wheels 220. A torque to the drive wheels 210 may be generated with electric motors 230A, 230B. Each drive wheel 210 may have a dedicated electric motor 230A, 230B and each electric motor 230A, 230B may be controlled with a respective controller 240A, 240B. The controller 240A, 240B may refer to an entity comprising a control unit 242A, 242B and an electrical drive 244A, 244B, which is arranged to generate a current to the respective electrical motor 230A, 230B in accordance with a speed order O1, O2 given by a respective control unit 242A, 242B to a respective electrical drive 244A, 244B. In the dual drive solutions applied to the lift trucks 200 the speed orders, e.g. referred with O1 and O2 in FIG. 2, and especially their difference may be controlled in accordance with a steering angle α, but also in accordance with at least one other parameter, such as a speed of the lift truck 200, as will be described in the forthcoming description. For sake of clarity, it is worthwhile to mention that the speed orders O1, O2 define target speeds for the respective drive wheels 210. Depending on an implementation of the lift truck 200 the speed orders O1, O2 may be expressed e.g. as a value of frequency or as a value of revolutions per minute (rpm).

In addition to above the control units 242A and 242B may be arranged to be communicatively coupled to each other e.g. by applying an applicable data bus, such as CAN (Controller Area Network) bus for exchanging data between the entities. According to an example embodiment one the control units 242A, 242B may be selected to operate as a so-called master device and the other of the control units 242A, 242B may then be arranged to operate as a so-called slave device. The master device may e.g. be arranged to obtain data from the slave device and process the data as will be described in the forthcoming description. According to a further example embodiment a control operation may be arranged so that a separate master control unit may be arranged in the lift truck 200, which is communicatively coupled to the control units 242A, 242B belonging to the controllers 240A, 240B and is arranged to obtain data from both of those and to process the data in accordance with the forthcoming description. For the purpose of describing at least some aspects of the example embodiments it is assumed that one of the control units 242A, 242B is arranged to operate as the master device.

Still further, the lift truck 200 may be equipped with an arrangement by means of which a speed V of a lift truck 200 may be monitored. For example, a control unit 242A, 242B, such as the one operating as a master device, may receive a signal in a real-time from an entity suitable for providing a signal representing the speed of the lift truck 200 preferably in real-time. Such an entity may e.g. be a sensor, such as a Hall sensor, sensor bearing or an optical sensor, arranged to measure a rotational speed of at least one electric motor 230A, 230B or any other entity, such as at least one of the wheels 210, 220, so that the speed V of the lift truck 200 may be determined. More specifically, the rotational speed of the electric motors 230A, 230B may be measured by applying a Hall encoder for reading pulses from a pickup ring installed to a motor shaft or by applying a sensor bearing installed inside the motor. Naturally, solutions based on separate sensors may also be applied to, such as an external or an embedded incremental encoder connected to the motor 230A, 230B or a gearbox, an external or an embedded absolute encoder connected to the motor 130 or to the gearbox. Any other measurement methods and/or devices may be used for determining the rotational speed of the motor 230A, 230B either directly or indirectly. The speed V of the lift truck 200 may be directly derived from the measurement value, or through applying mathematical methods to one or more measurement values, such as speeds of the drive wheels V1, V2 following the actual steering angle of the lift truck 200. In FIG. 2 an applicable element for generating, such as measuring, data suitable for the determination of the speed of the lift truck 200 is referred with a reference number 250 which may e.g. be a sensor associated with an electric motor 230A, 230B.

As regards to a measurement of the speed of the lift truck 200, or any entity therein, it may be arranged that a control unit 242A, 242B which is arranged to operate as a slave device may be arranged to deliver data representing the speed of the respective drive wheel 210 to the control unit 242A, 242B which is arranged to operate as the master device. As a result, the master device may derive the speed of the lift truck 200 from the received measurement data. Alternatively or in addition, in some example embodiment the data representing the speeds of the drive wheels 210 may be arranged to be directly delivered to the control unit 242A, 242B operating as the master device for further processing.

In addition, the lift truck may be equipped with an arrangement for determining a steering angle of the lift truck 200. The arrangement may comprise one or more applicable devices for determining the steering angle. For example, an incremental sensor may be applied, which provides data representing the steering angle with respect to a reference point wherein a steering is calibrated by driving the steering at a start-up of the lift truck 200 through the reference point.

Alternatively or in addition, a sensor generating data representing an absolute angle may be used to. For example, an incremental sensor applied with respect to the reference point may e.g. be an inductive sensor whereas data of the steering angle is generated with a sensor bearing, with a Hall sensor, with an optical sensor, or with an external incremental encoder, for example. As mentioned, data representing the steering angle may also be obtained with an applicable angle sensor, such as with a potentiometer, with a Hall sensor or with an absolute encoder. Some non-limiting examples of advantageous sensors may e.g. be a redundant angular Hall sensor positioned to a rear axle wheel turning axle or a redundant incremental Hall sensor positioned at a steering motor axle.

Based on the data the steering angle may be represented for the purposes of the example embodiments. The data representing the steering angle may be measured from a plurality of sources in order to guarantee an accuracy of the measurement. Alternatively or in addition, the data measured with applied sensors may be compared to other data derivable from the lift truck 200, such as to a measurement data obtained from electric motor(s) (e.g. rotational speed and direction).

Figure 3:
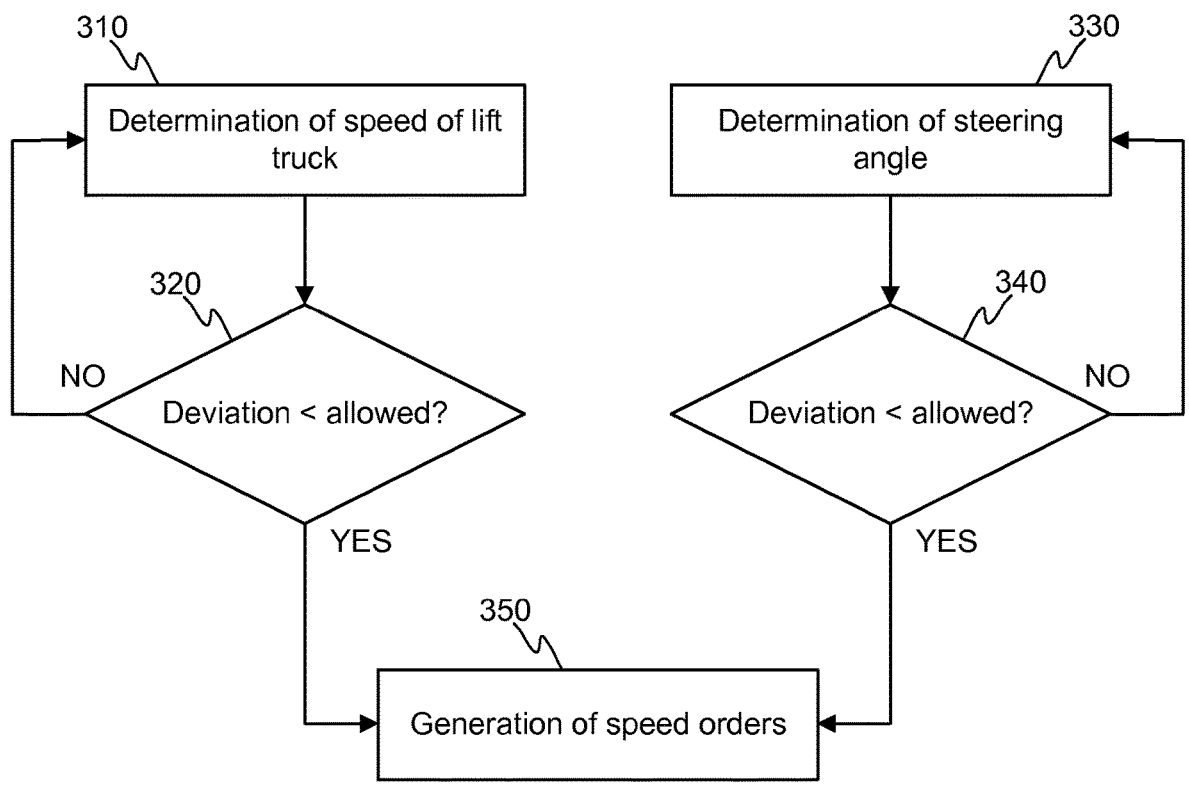
FIG. 3 illustrates schematically at least some aspects of a method according to an example embodiment.

Next, some further aspects are discussed by referring to FIG. 3 schematically illustrating at least some aspects of a method according to an example embodiment. First, a speed of the lift truck 200 is determined 310. The determination 310 may be performed by applying one or more of the approaches as discussed in the foregoing description, such as obtaining one or more measurement data from one or more sensors and determining the speed from the at least one measurement value. In response to the determination of the speed of the lift truck 200, the determined speed is compared to a predefined reference value and it is detected 320 if the deviation is less than allowed. A non-limiting example of a reference value for the speed of the lift truck 200 may be 5 km/h which is the maximum speed in which the solution according to example embodiments may be activated if also the other conditions are fulfilled. In other words, it may be determined if the speed of the lift truck 200 is below the predefined reference value. If the detection indicates that the speed deviates more than allowed from the reference value the determination of the speed of the truck is continued. Alternatively, if the detection 320 indicates that the speed deviates less than allowed from the reference value, this may be indicated as an input to step 350. For sake of clarity, the predefined reference may have an adjustment range where value may be determined with a testing procedure e.g. executed in predetermined conditions, such as conditions in which the lift truck 200 operates.

In addition to the branch relating to determining the speed of the lift truck 200 and using that as described a steering angle of the lift truck 200 may be determined 330. Advantageously, both the speed of the lift truck 200 and the steering angle are determined at the same instant of time, or at least within a predefined time window. The determination 330 of the steering angle may be performed by applying one or more of the approaches as discussed in the foregoing description. In response to the determination 330 of the steering angle, the determined steering angle α may be compared to a reference range, i.e. an allowed range of steering angles. For example, the reference range may be defined as 30 degrees. In other words, it may be detected 340 that the steering angle α of the lift truck 200 is within an allowed range or that it is not within the allowed range. In response to the detection that the steering angle of the lift truck 200 is beyond the allowed range, the determination 330 of the steering angle α, and possibly also the speed of the lift truck 200, may be continued. Alternatively, if the detection 340 indicates that the steering angle α belongs to the allowed range, this may be indicated as an input to step 350. For sake of clarity it is hereby mentioned that the steering angle α may be defined as an angle between a front of the vehicle and the steered wheel direction as shown in FIG. 2, but any other reference point may be applied to and the range is adjusted with respect to the reference point.

In response to a receipt of indications that the speed of the lift truck 200 is below a predefined reference value and that the steering angle belongs to a predefined range a generation of speed orders O1, O2 concurrently to respective electrical drives 244A, 244B may be performed. The generation of the speed orders O1, O2 refers to a mode in which the values of the speed orders O1, O2 are defined, such as limited, to be within a predefined speed order range from each other. According to an example embodiment the speed order range may be defined so that it defines a single value for the speed orders O1, O2 to be applied in the above described situation. In other words, by defining the speed order range to comprise a single value the speed orders O1, O2 are equal in such an example embodiment. In another example embodiment the speed order range may be defined so that it allows some variation between the speed order O1, O2 to be input to the respective electrical drives 244A, 244B. Advantageously, but not limited to, the speed order range may be defined so that it allows a predefined difference between the speed orders O1, O2, wherein the predefined difference between the speed orders O1, O2 is at maximum such that a difference between drive wheel tread peripheral speeds is less than 0.5 meter per second (m/s). Here, the definition is applicable due to a fact that the drive wheel tread peripheral speed is directly dependent on the respective speed order O1, O2. In accordance with the example embodiment the speed orders O1, O2 belonging to, or limited to, the predefined speed order range may be generated also with other steering angles α than 0 degrees i.e. the lift truck moving substantially to forward direction, or backward direction. As is derivable above, the idea with the above described arrangement is to define the speed orders O1, O2 to be within a predefined range under certain conditions especially relating to the speed of the lift truck 200 and the steering angle α of the lift truck 200.

For sake of clarity, the method according to the example embodiment as schematically illustrated in FIG. 3 may be implemented in a control unit 242A, 242B arranged to operate as the master device. In response to the generation of the speed orders O1, O2, the control unit 242A, 242B may deliver the speed order O1, O2 at least to the electrical drive 244A, 244B it controls to, and inform the control unit 242A, 242B operating as the slave device on the generated speed order O1, O2 for delivering it to the respective electrical drive 244A, 244B controlled by the control unit 242A, 242B operating as the slave device. In response to the receipt of the speed orders O1, O2 the respective electrical drives 244A, 244B are arranged to generate control signals, such as drive currents to the respective electric motors 230A, 230B causing the electric motors 230A, 230B to generate torques to the drive wheels 210, such as substantially equal torques if the speed orders O1, O2 are equal.

As discussed in the foregoing description, the generation of the speed orders O1, O2 may, in accordance with various example embodiments, be arranged so that a value of the respective speed order O1, O2 is constant, i.e. independent of the steering angle α, for every situation in which the mentioned criteria of the method are fulfilled. In other words, within the predefined steering angle range the control unit 242A, 242B may be arranged to generate speed orders O1, O2 having the constant value when the criteria as described are fulfilled, such as within a steering angle range ±30 degrees and with an applicable speed of the lift truck 200 the speed orders limited to the predefined speed order range are generated to the respective electrical drives 244A, 244B.

Figure 4:
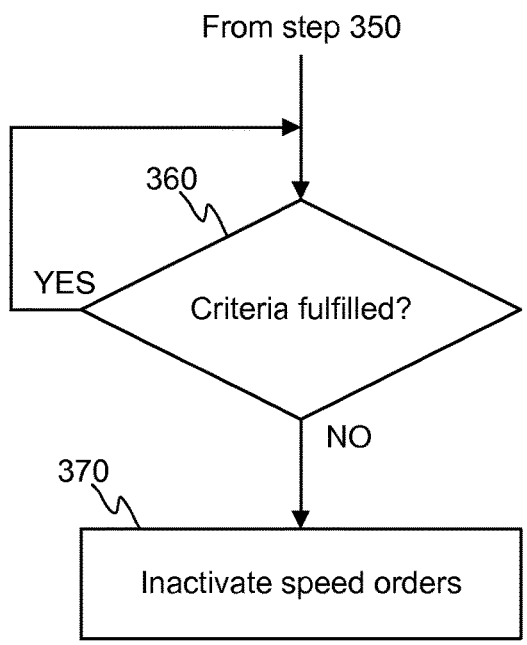
FIG. 4 illustrates schematically some further aspects of a method according to an example embodiment.

FIG. 4 illustrates schematically some further aspect of the method in accordance with various embodiments. Namely, in response to an activation of the mode in which the speed orders O1, O2 for the electrical drives 244A, 244B are set to be within the predefined speed order range it may be monitored 360 that the criteria set for applying the speed orders O1, O2 in the predefined speed order range are maintained. The monitoring 360 may e.g. comprise that the monitoring of the speed of the lift truck 200 and the monitoring of the steering angle α as schematically illustrated in FIG. 3 are continued and if it is detected (cf. steps 320 and 340 in FIG. 3) that at least one of these deviates from the reference more than allowed, the mode of generating the speed orders in the predefined speed order range may be inactivated. The inactivation 370 of the generation of the speed orders O1, O2 may mean that an individual speed orders O1, O2 to the respective electrical drives 244A, 244B may be generated e.g. in accordance to the steering angle α, for example. In other words, the value of the speed orders O1, O2 is not any more limited to belong to the predefined speed order range. In addition to the criteria relating to the speed of the lift truck 200 and the steering angle α one or more further criteria may be defined. For example, at least some functionalities controllable by a user e.g. through a user interface may be taken into account in the monitoring 360. According to an example, the user interface may comprise a functionality by means of which a user may manually control if the mode of generating the speed orders O1, O2 limited to the predefined speed order range is enabled at all e.g. even if the at least some of the criteria for the activation are fulfilled. For example, the user interface may e.g. comprise a specific button or foot switch for this purpose. Alternatively or in addition, a further criterion may be defined in accordance with a use of brake through a user interface, such as through a brake pedal, when the above described mode is activated. The monitoring of the use of the brake may e.g. be performed by monitoring a signal obtained from a position sensor associated to a brake pedal and if it indicates that the brake pedal is used for applying brake, the mode of generating the speed orders O1, O2 limited to the predefined speed order range may be inactivated to allow truck to follow better the defined steering angle.

In view of above, the use of the solution in accordance with the method as described may be dependent on an enablement of the activation of the method manually by the user of the lift truck, or even externally through a communication between a control entity and the lift truck 200. Moreover, the lift truck 200, such as the user interface of the lift truck 200, may be equipped with an indicator, such as a light source or a sound generator, by means of which a state of the mode of generating the speed orders O1, O2 limited to the predefined speed order range may be indicated. For example, if the mode is active the light source may generate light in order to inform the user that the mode is active.

Figure 5:
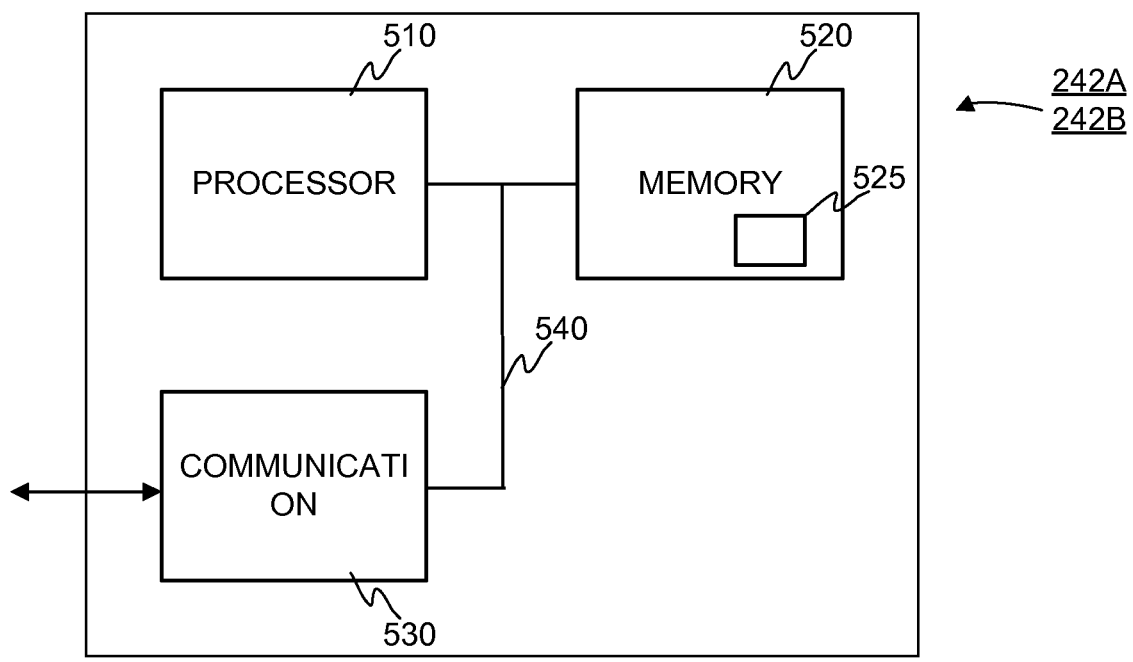
FIG. 5 illustrates schematically a control unit according to an example embodiment.

FIG. 5 illustrates schematically an example of a control unit 242A, 242B for performing the method according to at least some example embodiments of the invention. The control unit 242A, 242B is illustrated as a block diagram. The block diagram of FIG. 5 depicts some components of an apparatus that may be employed to implement the control unit 242A, 242B. The apparatus comprises a processor 510 and a memory 520. The memory 520 may store data and computer program code 525. The apparatus may further comprise communication means 530 for wired or wireless communication with other apparatuses, such as with the respective electrical drive 244A, 244B, and other entities of the lift truck 200, such as I/O components providing e.g. a user interface with the user of the lift truck 200 and any sensor device e.g. being involved in measuring the speed of the lift truck 200 as well as with other control units 242A, 242B. The components of the apparatus may be communicatively coupled to each other via a bus 540 that enables transfer of data and control information between the components.

The memory 520 and a portion of the computer program code 525 stored therein may be further arranged, with the processor 510, to cause the apparatus, i.e. the control unit 242A, 242B, to perform a method as described herein. The processor 510 may be configured to read from and write to the memory 520. Although the processor 510 is depicted as a respective single component, it may be implemented as respective one or more separate processing components. Similarly, although the memory 520 is depicted as a respective single component, it may be implemented as respective one or more separate components, some or all of which may be integrated/removable and/or may provide permanent/semi-permanent/dynamic/cached storage.

The computer program code 525 may comprise computer-executable instructions that implement functions that correspond to steps of the method as described when loaded into the processor 510. As an example, the computer program code 525 may include a computer program consisting of one or more sequences of one or more instructions. The processor 510 is able to load and execute the computer program by reading the one or more sequences of one or more instructions included therein from the memory 520. The one or more sequences of one or more instructions may be configured to, when executed by the processor 510, cause the apparatus to perform the method will be described.

Hence, the apparatus may comprise at least one processor 510 and at least one memory 520 including the computer program code 525 for one or more programs, the at least one memory 520 and the computer program code 525 configured to, with the at least one processor 510, cause the apparatus to perform the method as described.

The computer program code 525 may be provided e.g. a computer program product comprising at least one computer-readable non-transitory medium having the computer program code 525 stored thereon, which computer program code 525, when executed by the processor 510 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 525 may comprise a proprietary application, such as computer program code for controlling the torque. The proprietary application may be a client application of a service whose server application is running on a server apparatus of the system e.g. in a situation where the lift truck is at least in part controlled externally to the lift truck 200. The proprietary application may e.g. receive the described speed data and steering angle data as an input and to generate control signals in accordance with the input.

Any of the programmed functions mentioned may also be performed in firmware or hardware adapted to or programmed to perform the necessary tasks.

Some aspects of the present invention may refer to a lift truck 200 implementing the method as described utilizing at least control units 242A, 242B, electrical drives 244A, 245B and electric motors 230A, 230B and the other entities in the manner as described.

The various example embodiments described in the foregoing description provide a solution by means of which it is possible to increase friction between the drive wheels 210 and the surface the lift truck 200 is operation. Especially in a situation in which one of the drive wheels just spins disabling, or at least limiting, a motion of the lift truck 200, the present invention enables locking of the rotation of the drive wheels at least to some extent, and as a result a friction between the surface and the drive wheels may again be achieved. Moreover, the solution returns a rotation of a drive wheel spinning at least temporarily to the drive wheel rotating slower i.e. having the contact with the surface. The accuracy of the present invention may be adjusted by selecting the predefined speed order range optimally, such as the speed orders are set equal under the certain conditions. The smaller the difference between the drive wheel tread peripheral speeds is the less the drive wheel having a slower speed may race and, hence, loose grip, wherein the drive wheel tread peripheral speeds are directly dependent on the speed orders O1, O2 provided to the respective electrical drives. Generally speaking, it may be considered that by applying the present solution it is possible to take advantage of both the dual drive solution and the differential lock solution.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling of at least two electric motors of an electric lift truck, each of the at least two electric motors controllable with a respective electrical drive and arranged to generate a torque to a respective drive wheel, the method comprising:
    generating a respective control signal to each of the electrical drives of the at least two electric motors in response to a detection that a speed of the electric lift truck is below a reference value and that a steering angle of the electric lift truck is within a reference steering angle range, the respective control signal carrying a respective speed order to each of the electrical drives,
    wherein the respective speed orders for the electrical drives are defined to be within a predefined speed order range from each other, for generating torques to the drive wheels by each of the at least two electric motors.

2. The method of claim 1, wherein the speed of the electric truck is determined by obtaining at least one measurement value from a sensor measuring at least one of the following: rotational speed of the at least one electric motor; rotational speed of at least one wheel of the electric lift truck.

3. The method of claim 1, wherein the steering angle of the electric truck is determined by obtaining data by one of:
    a redundant angular Hall sensor positioned to a rear axle wheel turning axle;
    a redundant incremental Hall sensor positioned at a steering motor axle;

a redundant absolute angle sensor positioned to a wheel turning axle;

a single channel absolute angle sensor and a reference sensor positioned to a wheel turning axle;

a linear distance sensor installed to wheel turning cylinders.

4. The method of claim 1, the method further comprising: monitoring if a generation of the respective control signals carrying the respective speed orders is to be cancelled by defining a plurality of criteria for cancelling.

5. The method of claim 4, wherein the criteria comprise a criterion related to the speed of the lift truck and a criterion related to the steering angle of the lift truck.

6. The method of claim 4, wherein the criteria comprise at least one criterion related to a user action through a user interface of the lift truck.

7. The method of claim 6, wherein the user action is one of the following: disabling a capability to generate the respective speed orders with the user interface; activating a brake function of the lift truck.

8. The method of claim 1, wherein the predefined speed order range is defined as one of the following: a single value defining the respective speed orders to be equal; a difference between the respective speed orders is at maximum such that a difference between drive wheel tread peripheral speeds is less than 0.5 meter per second.

9. A control unit for controlling of at least two electric motors of an electric lift truck, each of the at least two electric motors controllable with a respective electrical drive and arranged to generate a torque to a respective drive wheel, the control unit comprising at least one processor; and at least one memory including computer program code;

the at least one memory and the computer program code configured to, with the at least one processor, cause the control unit to:

generate a respective control signal to each of the electrical drives of the at least two electric motors in response to a detection that a speed of the electric lift truck is below a reference value and that a steering angle of the electric lift truck is within a reference steering angle range, the respective control signal carrying a respective speed order to each of the electrical drives, wherein the respective speed orders for the electrical drives are defined to be within a predefined speed order range from each other, for generating torques to the drive wheels by each of the at least two electric motors.

10. The control unit of claim 9, wherein the control unit is arranged to determine the speed of the electric truck by obtaining at least one measurement value from a sensor measuring at least one of the following: rotational speed of the at least one electric motor; rotational speed of at least one wheel of the electric lift truck.

11. The control unit of claim 9, wherein the control unit is arranged to determine the steering angle of the electric truck by obtaining data by one of:

a redundant angular Hall sensor positioned to a rear axle wheel turning axle;

a redundant incremental Hall sensor positioned at a steering motor axle;

a redundant absolute angle sensor positioned to a wheel turning axle;

a single channel absolute angle sensor and a reference sensor positioned to a wheel turning axle;

a linear distance sensor installed to wheel turning cylinders.

12. The control unit of claim 9, the control unit is further arranged to: monitor if a generation of the respective control signals carrying the respective speed orders is to be cancelled by defining a plurality of criteria for cancelling.

13. The control unit of claim 12, wherein the control unit is arranged to apply criteria comprising a criterion related to the speed of the lift truck and a criterion related to the steering angle of the lift truck.

14. The control unit of claim 12, wherein the control unit is arranged to apply criteria comprising at least one criterion related to a user action through a user interface of the lift truck.

15. The control unit of claim 14, wherein the control unit is arranged to apply as the user action one of the following: disabling a capability to generate the respective speed orders with the user interface; activating a brake function of the lift truck.

16. The control unit of claim 9, wherein the control unit is arranged to apply as the predefined speed order range one of the following: a single value defining the respective speed orders to be equal; a difference between the respective speed orders is at maximum such that a difference between drive wheel tread peripheral speeds is less than 0.5 meter per second.

17. A non-transitory computer-readable medium on which is stored a computer program product for controlling of at least two electric motors of an electric lift truck, each of the at least two electric motors controllable with a respective electrical drive and arranged to generate a torque to a respective drive wheel, which computer program product, when executed by at least one processor, cause a control unit of the electric lift truck to perform the method according to claim 8.

18. An electric lift truck comprising:

at least two electrical drives, at least two electric motors controllable with a respective electrical drive, and at least one control unit of claim 9.

* * * * *